(12) United States Patent
Cordell et al.

(10) Patent No.: US 10,432,795 B1
(45) Date of Patent: *Oct. 1, 2019

(54) PERFORMING AUTOMATED EVENT SERVICES TO REGISTERED END USERS

(71) Applicant: West Corporation, Omaha, NE (US)

(72) Inventors: Jeffrey William Cordell, Omaha, NE (US); Michael T. Mateer, Omaha, NE (US); Chad David Hendren, Elkhorn, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,950

(22) Filed: Jun. 5, 2018

Related U.S. Application Data

(63) Continuation of application No. 15/671,346, filed on Aug. 8, 2017, now Pat. No. 9,992,345, which is a continuation of application No. 15/083,734, filed on Mar. 29, 2016, now Pat. No. 9,729,723, which is a continuation of application No. 14/626,139, filed on Feb. 19, 2015, now Pat. No. 9,300,809, which is a continuation of application No. 14/193,195, filed on Feb. 28, 2014, now Pat. No. 8,971,512, which is a continuation of application No. 13/415,436, filed on Mar. 8, 2012, now Pat. No. 8,681,964, which is a continuation-in-part of application No. 12/433,985, filed on May 1, 2009, now Pat. No. 8,582,742.

(51) Int. Cl.
*H04M 3/42* (2006.01)
*H04M 3/56* (2006.01)
*G06Q 10/10* (2012.01)

(52) U.S. Cl.
CPC .......... *H04M 3/563* (2013.01); *G06Q 10/109* (2013.01); *H04M 3/42* (2013.01); *H04M 3/42068* (2013.01); *H04M 2203/205* (2013.01); *H04M 2203/2072* (2013.01); *H04M 2203/5063* (2013.01)

(58) Field of Classification Search
CPC ...................................................... H04M 3/42
See application file for complete search history.

(56) References Cited

U.S. PATENT DOCUMENTS

2005/0152523 A1* 7/2005 Fellenstein ............. H04M 3/56
379/202.01

\* cited by examiner

*Primary Examiner* — Olisa Anwah

(57) ABSTRACT

A method and apparatus are disclosed of transmitting live event notification information to a user device. One example method may include retrieving event user preference information from an event user database based on prestored user preferences. The method may also include transmitting an initial event notification message to an end user communication device based on the event user preference information to notify the end user of an upcoming event and receiving a response message from the end user communication device indicating a current availability of the end user. The user device may receive notification information via more than one communication channel and respond in a number of different ways.

20 Claims, 9 Drawing Sheets

PERFORMING AUTOMATED EVENT SERVICES TO REGISTERED END USERS

CROSS-REFERENCE TO RELATED APPLICATIONS

This application is a Continuation from U.S. patent application Ser. No. 15/671,346, filed Aug. 8, 2017, and entitled "PERFORMING AUTOMATED EVENT SERVICES TO REGISTERED END USERS", which is a Continuation from U.S. patent application Ser. No. 15/083,734, filed Mar. 29, 2016, and entitled "PERFORMING AUTOMATED EVENT SERVICES TO REGISTERED END USERS", now issued U.S. Pat. No. 9,635,065 which is a Continuation from U.S. patent application Ser. No. 14/626,139, filed Feb. 19, 2015, and entitled "PERFORMING AUTOMATED EVENT SERVICES TO REGISTERED END USERS", now issued U.S. Pat. No. 9,008,295, which is a Continuation from U.S. patent application Ser. No. 14/193,195, filed Feb. 28, 2014, and entitled "PERFORMING AUTOMATED EVENT SERVICES TO REGISTERED END USERS", now issued U.S. Pat. No. 8,971,512, which is a Continuation from U.S. patent application Ser. No. 13/415,436, filed Mar. 8, 2012, and entitled "PERFORMING AUTOMATED EVENT SERVICES TO REGISTERED END USERS", now issued U.S. Pat. No. 8,681,964, which is a Continuation-in-Part Application based upon U.S. patent application Ser. No. 12/433,985 entitled "PERFORMING AUTOMATED EVENT SERVICES TO REGISTERED END USERS," filed May 1, 2009, now issued U.S. Pat. No. 8,582,742, each of which is incorporated by reference herein in their entirety.

TECHNICAL FIELD OF THE INVENTION

The present invention is generally related to automated registered event notification and reminder notification to end users using a telecommunications switch to provide event services to individual end users.

BACKGROUND OF THE INVENTION

There has been an increase in recent years of the availability of public digital grade networks, such as the World Wide Web ("WWW") and the Internet, to exchange voice communication signaling. Conventional, voice and media data exchange platforms are performed via an individual dialer device that dials out to an end user that is pre-registered to receive a broadcast event. In one example, if an end user registers for a town hall meeting to be broadcast at a later time, then prior to the town hall meeting, the end user device (i.e., mobile terminal) would need to be dialed-up directly and would also need to keep her own line open from a single dialer device.

It would be optimal if multiple remote end users communicating through computer voice functionality over, for example, the Internet, could be dialed up to receive access to a "town hall" meeting by communicating through standard telephony links, such as, the public switched telephone network (PSTN). In addition, it would be further optimal to reduce the charges that are incurred from interactive voice response (IVR) services and to utilize telecommunications ports of standard PSTN connections to provide broadcasting for "town hall" events to all pre-registered end users.

SUMMARY OF THE INVENTION

The present invention provides a system, method, and computer readable medium of providing an automated registered event notification and reminder notification to end users using a telecommunications switch to provide event services to individual end users.

An example embodiment of the present invention may include a method of providing customized event data to an end user communication device. The method may include retrieving event user preference information from an event user database and transmitting an initial event notification message to an end user communication device based on the event user preference information to notify the end user of an upcoming event. The method may also include receiving a response message from the end user communication device indicating a current availability of the end user.

Another example embodiment of the present invention may include an apparatus configured to provide customized event data to an end user communication device. The apparatus may include a processor configured to retrieve event user preference information from an event user database and a transmitter configured to transmit an initial event notification message to an end user communication device based on the event user preference information to notify the end user of an upcoming event. The apparatus may also include a receiver configured to receive a response message from the end user communication device indicating a current availability of the end user.

DETAILED DESCRIPTION

Figure 1:
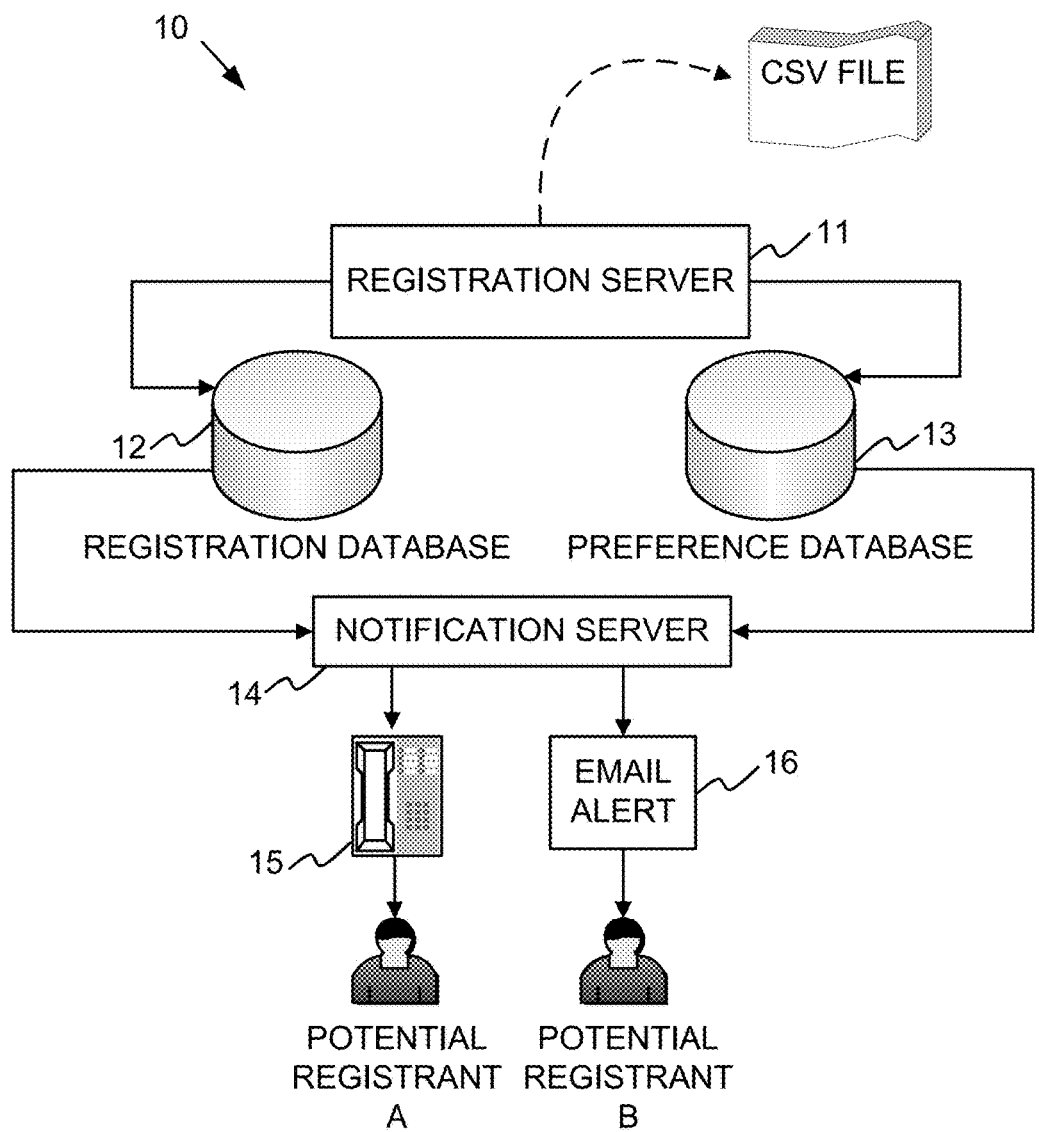
FIG. 1 illustrates a network configuration of registering customers for events.

FIG. 1 illustrates a registration networking system 10 that provides a registration and list generation process according to an example embodiment of the present inventive concept. Referring to FIG. 1, the networking registration system includes a registration server 11, a registration database 12, a preference database 13, a notification server 14, a telephone calling device 15, and an email or other electronic notification alerting device 16. The networking system 10 provides a registration procedure to register potential registrants for upcoming events, such as, for example, town hall meetings, telecasts, broadcasts, and other audio and/or video data events.

In operation, the notification server may initiate a notification message to potential registrants "A" and "B" who are pre-registered in the registration database 12 to receive pre-event registration reminders of upcoming events. The potential registrants may read or listen to information regarding the event and decide whether the event is something that they would like to be registered for when the event takes place in the near future.

The potential registrants "A" and "B" may receive the event registration information via e-mail and/or an auto-dialer telephony sub-system, which dial the user's telephone number and offer information upon the user's answering of the call. Other event registration information notifications may include text messaging (short message service 'SMS') and/or any other computer or mobile-phone based notification tool available to the registrants.

In one example, an event may be solicited to potential registrants in the form of a voice mail with a web link embedded in the voice and/or in an accompanying e-mail. For example, a town hall mayor may leave a voice message to the potential registrants as a 'welcome' and invitation to begin listen in on the event, but, may also include a web link "www.clickherefortownhallmeeting.com" as a click only tool to access and register for the event.

Upon receiving the event registration information, the potential registrants "A" and/or "B" will either elect to be included in the upcoming event or to decline participation in the upcoming event. Assuming registrant "A" elects to be part of the event, the registrant "A" may also elect certain profile-related options which include preferences for receiving the event data in a particular manner and may also include preferences for the way the event data is offered. For example, registrant "A" may elect to participate in the event via her cell phone. The call may be received at the user's cell phone number and may include audio but not video because the user may wish to save money on expensive high bandwidth video data by only listening to the audio and not watching the video portion that is otherwise made available.

Once the registrant's preferences are known, those preferences may be stored in the preference database 13 so that the registrant's preferences may be recalled at a later time (i.e., when a registered event is about to take place). The registration database 12 will store other registrant user information, such as, user name, telephone number, location, request for reminder, automated call-to-join event feature enablement and other user related information. The registration database 12 will also provide a list of the pre-registered registrants who should be contacted for a particular event. In addition, the types of events may be further matched to meet the registrants' preferences and profile information (i.e., a registrant with a lawyer occupation may be profiled for recent Supreme Court decisions broadcast as upcoming events).

Once the registration procedure is completed and a list of potential registrants, their event preferences, and their respective identification information has been obtained, the information may be stored in a data file or basic comma-separated-value (CSV) data file. The CSV file may, in turn, be forwarded to a file transfer protocol (FTP) website that uploads the information into an online database system of a notification networking system 20 of FIG. 2.

Figure 2:
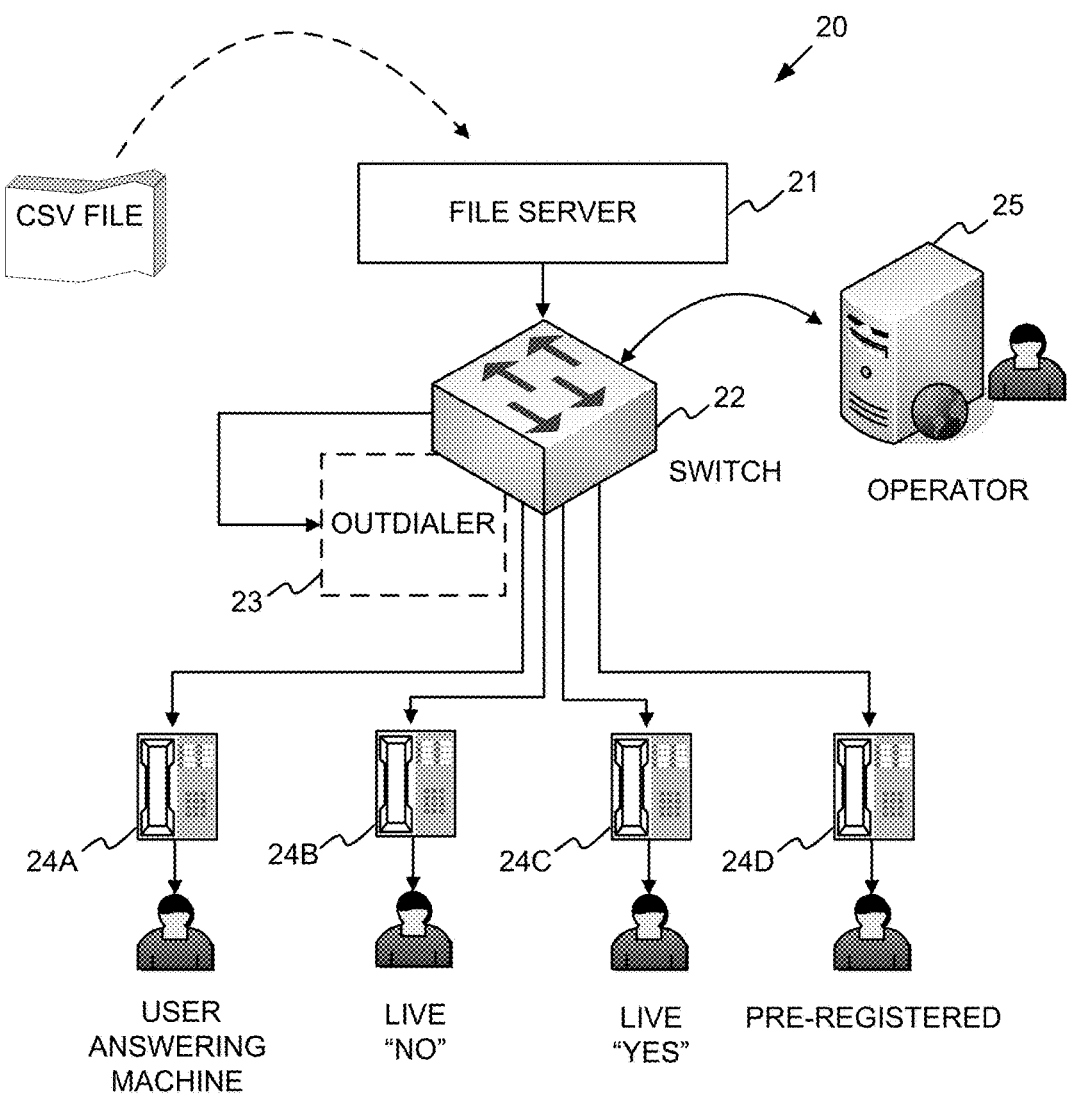
FIG. 2 illustrates a network configuration that continues from FIG. 1 and which provides reminders and event connection services to users.

Referring to FIG. 2, the notification networking system 20 includes a file server 21, a call and data handling network switch 22, an outdialer 23 and user registrants 24A-24D.

Once the CSV file is received at the file server 21, the data entries in the CSV file must be processed and translated into notification entries for later processing of notifications.

The file server 21 may include a multi-channel network (MCN) application that provides notification handling based on the generated notifications. The MCN may also format the data of the event for delivery to the registered users. For example, the MCN may format VXML data for audio delivery across various different types of channels. The file server 21 may also include a business process application that manages the outdialing process and business related matters related to event notifications.

Once the MCN has formatted the delivery scheme for presenting event data to the registered users. A calling operation is forwarded from the switch 22 to the outdialer 23, which may be separate from the switch 22, or, instead, may be part of the switch as a virtual outdialer application module. The outdialer 23 will notify the switch 22 to perform calling operations to customer phones 24A-24D. For example, the outdialer can call the customers phones and will receive a response based on dual tone multi-frequency responses (DTMF) or via speech recognition. The speech recognition may be provided by attaching an automatic speech recognition (ASR) unit to the outdialer 23.

Referring to the customer phones 24A-24D, in a first scenario a customer's answering machine may answer the reminder for the event. In such a case, the outdialer may leave an automated pre-recorded voice message that the user of the answering machine 24A can listen to at a later time. For customer 24B, the automated reminder may connect to the customer 24B who responds to the event reminder by saying "NO." In this example, the customer has effectively made the decision not to connect to the event and will not be reminded of the same event again. In addition to receiving a call, reminders and event notifications in general may be provided by other automated communication mechanisms, such as, chat, instant messaging (IM), SMA, fax, etc., in addition to voice and email services.

Referring to customer 24C, conversely from the above-example of the user saying "NO", customer 24C may speak "YES" into the phone upon being called and reminded of the event. In such a case, customer 24C will have her call routed to join the event via a conference call bridge service located at a third party facility.

In the last case, the customer 24D will be pre-registered to accept the event registration reminder by simply pressing "1" or another DTMF button on her phone to effectively accept participation in the event. In such a case, the customer 24D will have her call routed to a pre-registered automated service application that matches her telephone number via an automatic number identification (ANI) service. The ANI matching operation may be performed by matching the customer's number with preference and registration information pre-stored in a registration database or file.

Once a customer has accepted event registration, the call may be transferred to a pre-conference lobby that maintains the call connection until the event is ready to begin. Alternatively, the customer may be called back automatically at the time the event is ready to begin, which could save air time for a cellular phone service.

When calling the registered user, the present implementation may operate at the enterprise level to contact multiple end user customers (i.e., 100,000 registered users may be contacted to receive the town hall data feed and 10,000 may actually confirm attendance). There is no need for a single dialer to perform the calling of each of the registered users. Instead, it is possible to dial-out to all of the registered users at the time of the event, and use a media gateway or switch 22 to hold the lines open using a standard telecommunications (i.e., PSTN) resource platform.

By holding the lines open using the PSTN, there is no need to bridge in order to hold the lines open. By avoiding the bridge requirements, it is possible to perform a town hall broadcast via the switch 22 based on simply a PSTN port charge. By using a PSTN port to perform the town hall broadcast, it is possible to minimize expensive interactive voice response (IVR) server charges for each of the individual customers. This way, the customers receive an IVR-type service without additional IVR-based charges.

The entire process of broadcasting a town hall meeting to a large number of registered customers may be entirely automated. For example, by using the event registration platform, end users may register weeks ahead of time (i.e. product release, etc.) and may be notified right before the call is going to begin and then may be joined into the call without having to set it up ahead of time.

The switch 22 provides a call transferring service that either provides a conference call bridge, or, instead, connects the call without using a bridge. In the no bridge scenario, the switch 22 will maintain the caller leg and add the leg to a bridge but will drop the voice dialer 23 function and permit a next call function via a call detail record. Once the IVR leg has been established as a connection via an IVR outdial port, the called user may be transferred to the event conference automatically, or, at least transferred to an operator 25, where the user may receive additional assistance.

During the IVR outdial port initial calling procedure, the user is called and asked if she wants to join the conference event. The user, although already registered, may then decide if the conference event is still appropriate at that current time. The user may confirm that she wants to continue with participating in the conference event by pressing a key or selecting an option to confirm attendance via the user handset device.

Once the user's confirmation to join the conference event is received, the user may be transferred into the conference event automatically without further delay. Alternatively, the user may confirm and/or request to be transferred to an operator 25 directly to receive further assistance. The operator 25 may provide user assistance by guiding the user with detailed instructions to join the conference, or, instead, to join the conference based on further user requirements of options available to the user.

After the user joins and the confirmation has been received by the operator 25 and/or the user, the IVR port that was used to provide the conference event feed may be released since the call connection is established for that particular user (i.e., the call was handed-off). This provides the conference event service with the availability to provide a next user with an opportunity to join the conference event instead of being tied-up with a single caller.

The switch 22 establishes the legs for the confirmed users 24C and 24D. After registration is performed, the IVR leg is dropped and the call is held by the switch 22. This configuration essentially places and maintains the leg in the conference bridge. There may be two legs for each user, the leg that goes into the bridge function of the switch 22 and the leg that comes out of the bridge function.

In the case where the customer is pre-registered for the conference, there is no need to further screen the user. In other words, the automated ANI entry matching of the customer number to a pre-registered database will connect the customer automatically to the event.

The operator 25 may be an automated server computer including a computer readable medium for providing an automated software program function. The operator 25 may instead require an administrator to provide various management functions. Examples of the management functions may include archived playback services, operator services, pre-registered ANI matching services and may also include an event moderator bridge function.

The event moderator bridge function may include conference moderation, conference question and answering, conference head-counting, conference notification delivery, conference notification call and throttling support, a trunk group port monitor and a stream participant count. For example, Most of these functions are self-explanatory, as for throttling support, the operator 25 may throttle back the rate of calls outstanding and the rate of simultaneous calls outstanding in order to manage ports. For instance, given a current number of calls outstanding, it may be necessary to borrow ports and/or prioritize ports to accommodate each of the outstanding participants.

In another example of throttling, outdial throttling may be performed to hold back a number of calls based on the size of the queue for certain types of calls. In operation, a user can be inserted into the call or to an operator automatically without any assistance. In another example, outdial throttling may be performed to modify the port transfer rate so that the optimal bandwidth is used to transfer data on the designated port. If the maximum number of ports is reached for the service capability of the switch 22, the operator 25 may provide a message to the users to access a URL for the same information during or after the call itself. This provides an alternative site that may be accessed by the users to receive the call.

Other features may include using capture registration information to invite users in to pre-register for an event. A leader-view monitor may also be used to determine who will set up the calls to get into the conference to ensure that there is no overbooking.

When a registered user connects to the conference when no operator is present, the registered user connects based on their ANI information. The ANI information may also be used to map the user's personal information to their ANI. In this example, if a registered user is participating in the town hall meeting then that person may push a button on their handset to ask a question and may have their name presented based the mapping between their ANI and their personal information. The ANI provides a way to keep track of the user's personal information and to refer to it when necessary.

Figure 3:
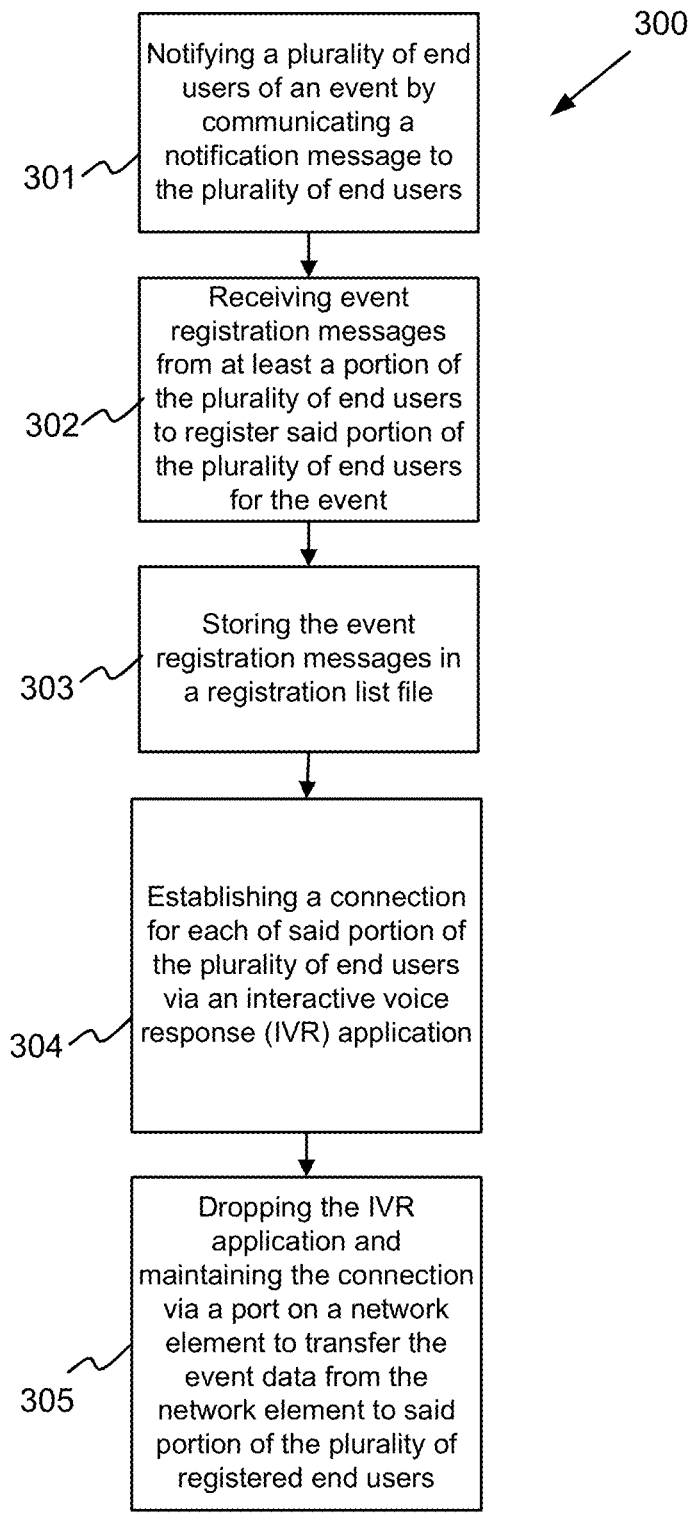
FIG. 3 illustrates an example method according to an example embodiment of the present invention.

An example method 300 according to an embodiment of the present invention is illustrated in FIG. 3. The method may include notifying a plurality of end users of an event by communicating a notification message to the plurality of end users at operation 301. The method may also include receiving event registration messages from at least a portion of the plurality of end users to register said portion of the plurality of end users for the event at operation 302 and storing the event registration messages in a registration list file at operation 303. Other operations may include establishing a connection for each of said portion of the plurality of end users via an interactive voice response (IVR) application at operation 304 and dropping the IVR application and maintaining the connection via a port on a network element to transfer the event data from the network element to said portion of the plurality of registered end users at operation 305.

According to another example embodiment of the present invention, invitation town hall or large-scale conference calls setup ahead of the scheduled call may have a corresponding show rate or log-in/dial-in rate that is significantly lower than the number of invited or confirmed participants. Manual outdialing may increase the number of participants, however, burdensome administrative efforts are required to operate a manual outdial system. The success rate of increasing the number of user participants depends largely on the ability to tailor the dial-in options and reminder options to ensure user flexibility. For example, by including email, voice mail, SMS text messaging, hyperlink access and other reminder/log-in options, the user may be able to have an opportunity to receive a customized user preference-based town hall meeting invitation or reminder. User preferences may be identified and stored in a preference database for cross-referencing with reminder applications, such as a user calendar application and execution procedure.

Figure 4:
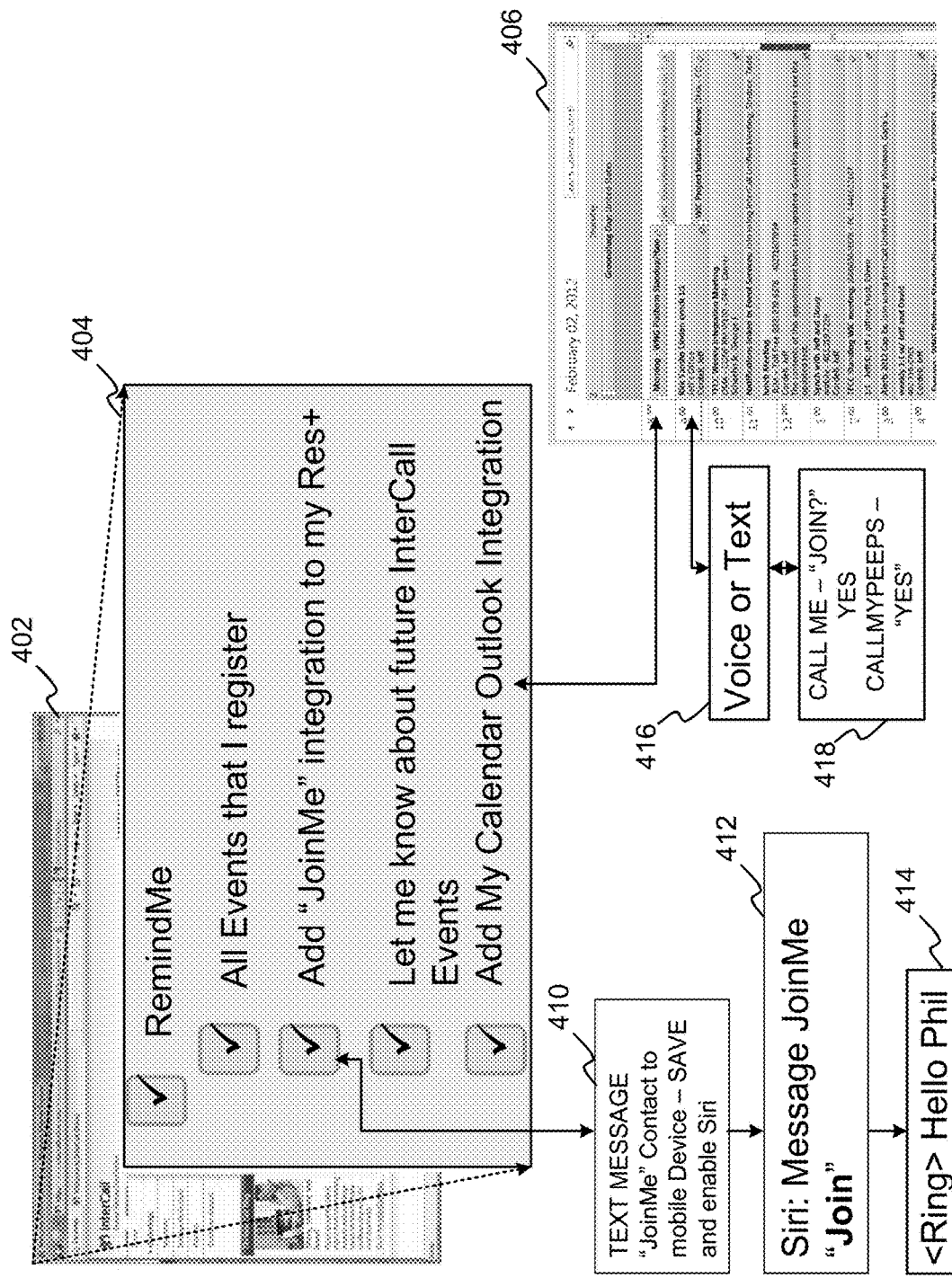
FIG. 4 illustrates an example logic diagram of a caller notification event procedure according to example embodiments of the present invention.

FIG. 4 illustrates an example user preference interface and logic diagram according to example embodiments of the present invention. Referring to FIG. 4, a user interface web portal 402 may be accessed by username and/or password to setup a user's personal communication options. A user may elect to receive various event or conference call reminders via interface 404. For example, the user may ask for reminders for "all events" for which the user is registered, and add "joinme" integration to a third party application (Res+). The user may also ask to be informed about future events handled by the same event/call processing system, and/or to have a calendar application integrated with the event information of current and future events.

The calendar application 406 (i.e., Microsoft Outlook®, Google calendar, etc.) may receive an entry for an upcoming event or conference call (e.g., streaming voice, streaming video, interactive feedback options, communications privileges, etc.). The dated entry may be automatically submitted to a user's calendar via a SMS message and an email message. The calendar entry may include a packet instruction that provides a voice call, text message and/or email generation to be integrated into the calendar entry associated with the upcoming event. In further detail, a voice message may be submitted via a phone call or a text message 416 to the user's mobile device. The text message 416 may include information 418 instructing the user to "join" the active or upcoming event by typing "join" or accepting to join the event. Alternatively, the call may instruct the user to say "join" into the interactive voice response feedback system accompanying the automated call. Additional instructions may offer further possibilities, such as calling a group of intended participants setup by the user "call my peeps" as a registered moderator or as a friend or acquaintance of a group of other users whom the first user desires to share the event. In another example, the third party social networking group function "Res+" may enable an automated join function that transmits a join request 410 to a first user and enables an automated call or text message function to join the live event via a simple join option 412 and a corresponding call connection function that calls the user 414 upon confirming the user's request to join the live event.

According to one example conference call setup procedure a user named 'Phil' may dial a conference call number 888-888-xxx at 5:51 pm and then a corresponding conference code 123456789#. The caller will likely experience a delay before hearing an automated operator response "Thank you for joining the amateur high wire trapeze enthusiast club meeting, can I have your first and last name please?" The caller may respond "Phil Carpenter." The automated response system may then prompt the caller for a detailed spelling to which the caller responds "P-H-I-L C-A-R-P-E-N-T-E-R." The voice response system may then ask for additional information, such as phone number, address, email address, etc. The caller will respond by speaking letter by letter responses to fulfill the questioning performed by the IVR call processing system.

According to another example embodiment, the user may receive a call at 5:59 pm on his telephone or mobile device. The phone call may provide a predetermined ring back tone to identify the purpose of the call (i.e., circus music), which is a high-wire club event call. The caller may identify the called number by an automatic user called number identification procedure (e.g., dialed number identification service (DNIS)). The identified called party's number and corresponding user information may be retrieved from a registration database to include information, such as user contact preferences, user name, address, password, etc. The IVR system may then proceed by identifying the caller at the onset of the answered call "Hello Mr. Carpenter on a wire, welcome to the greatest show on a high-wire. The high-wire lesson is about to begin. Please say JOIN when prompted and the lesson will begin shortly by audio and video if your device is compatible to receive such information feeds." The user may respond by saying "join" and the audio/video feed may proceed to stream to the user.

In another example, the called party may receive the call the same as the above example, but may currently be on the other line. The IVR system in this case may send a text message at 6:02 pm "Hey Phil, the high-wire meeting is underway" reply to this text with "JOIN" to log into the meeting. As the user responds, an active call may be initiated and the music may begin to play. Alternatively, the caller may be away from his or her phone and may receive another text message informing the user that the event is over but with an option to view or hear a replay of the session. The called party may respond with a "JOIN" message to begin receiving the recorded audio/video feed.

Figure 5A:
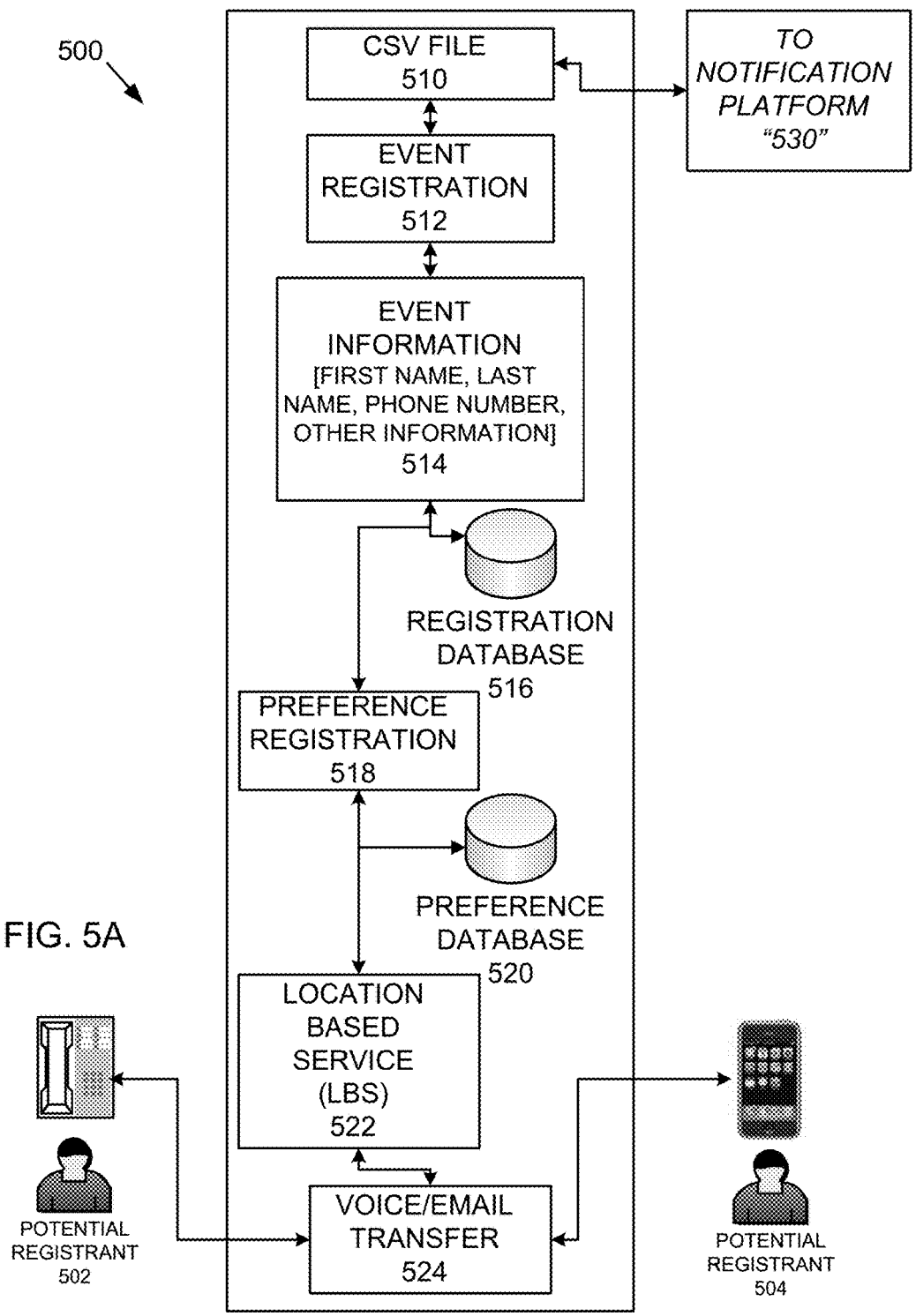
FIG. 5A illustrates an event registration processing system and corresponding logic diagram according to example embodiments of the present invention.

FIG. 5A illustrates an example call/event processing platform and logic diagram according to example embodiments of the present invention. Referring to FIG. 5A, an event registration and list generation system 500 illustrates two potential event registrants 502 (operating a landline phone) and 504 (operating a smartphone device) are configured to receive event or call messaging, event or call notifications and streaming call or event data. In operation, proactive notifications may be generated and sent to potential registrants 502/504 according to a predetermined time cycle. The potential registrants may be part of a constituents' list of known persons identified by name, phone, address, email, etc. A voice/email transfer module 524 may provide the notifications and corresponding event data. A location based service 522 may be used to provide caller location information to determine the potential registrant's location prior to offering access to the current event (town hall meeting). Certain offers may be provided to the user via a web link "mytownhall.com" (example URL not intended to be a source of information for purposes of this application), as a website received by the called parties in a voicemail message, which may be used for preregistration to the event. The link may be a link to a particular event registration with a summary list of representatives/districts to pick from list.

The event pre-registration effort may gather all relevant information: first/last name, ANI phone number, email, request for reminder, automated call to join event, request for inclusion, etc. The retrieved preferences may be stored in a preference database 520 for current and/or future event processing for a particular user. For example, a preference for a mode of contact (e.g., phone, email, mobile device, etc.) may be setup in the preference database 520. A resultant registration and/or pre-generated list may be created and formatted via a preference registration module 518 and stored as a list in the registration database 516. The list may be sent to a FTP site to include event information 514 and an event registration code or file authorizing and identifying the registrant, as created by an event registration module 512. A comma separated value (CSV) file 510 may be created and sent to the notification platform 530 (continued on FIG. 5B).

Figure 5B:
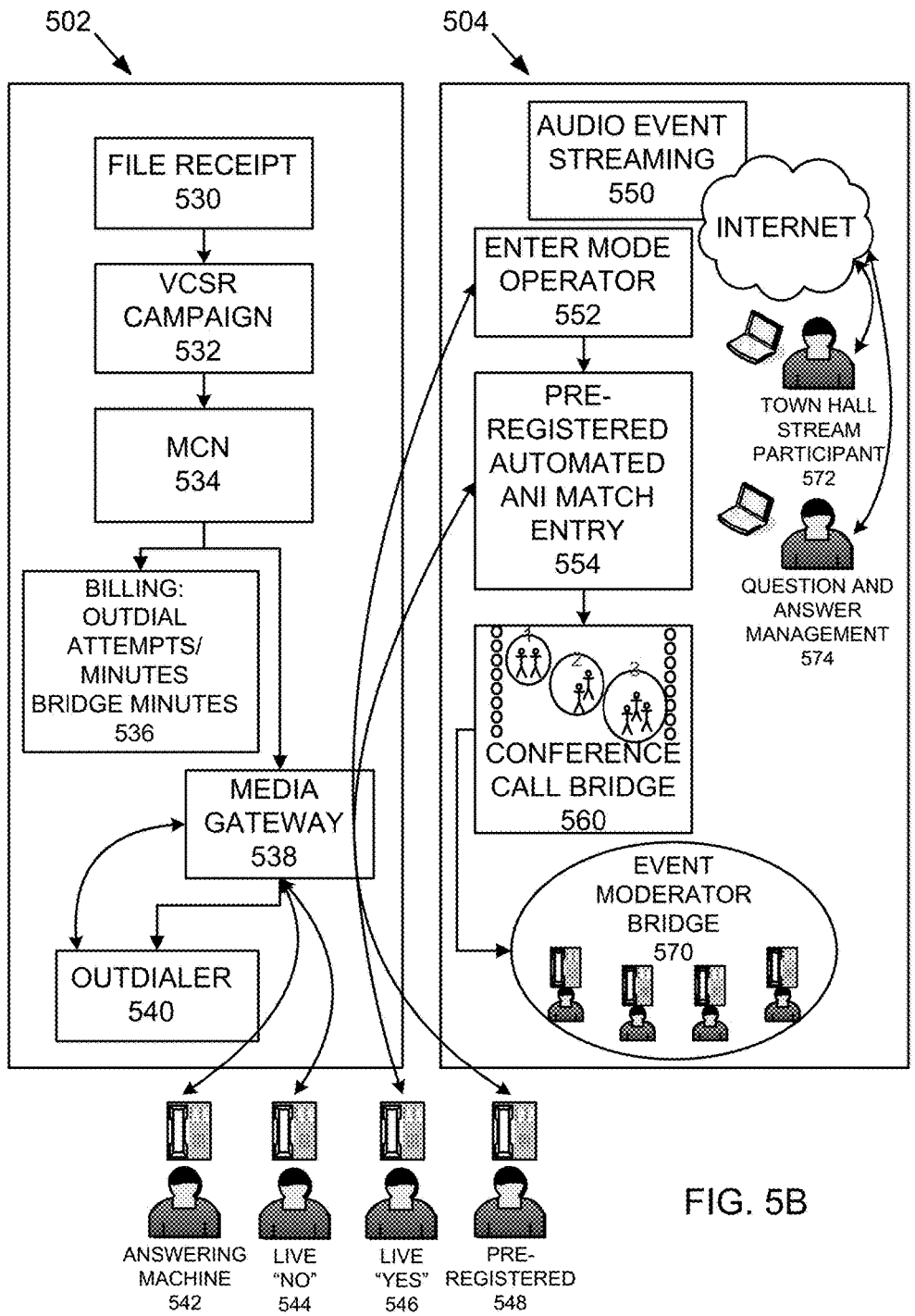
FIG. 5B illustrates an event notification and call processing system and corresponding logic diagram according to example embodiments of the present invention.

FIG. 5B illustrates an event/call notification system 502 and event/call processing system 504 according to example embodiments. Continuing with the received CSV data file, a file receipt module 530 may receive the CSV file via FTP of SFTP for processing via the notification system 502. A virtual customer service representative campaign module 532 may identify the type of event and participant information needed to setup the proper notifications and reminders. A missed call notification module 534 may identify missed calls and other measures for handling such events during a notification cycle. Information, such as billing and outdial attempts 536 are identified and recorded to ensure proper call attempts and processing measures.

A media gateway 538 is responsible for determining when to transmit notification information to each of the users who are identified as potential registrants (542-548). An outdialer application or module 540 may be coupled to the media gateway 538 to ensure the registrants are called to notify each of them of the upcoming event(s). For calls to registrants that are either preregistered 548 or have willingly accepted to participate in the event 546 may be forwarded to the live event platform 504. For example, the pre-registered users may be identified by a pre-registered automatic number identification (ANI) module 554 that identifies the called user via his or her associated device ANI. For the confirmed users who accept the live invitation, a mode operator module 552 may be used to route the call to the conference based on user input or user feedback (i.e., DTMF selections, voice confirmation Y/N, etc.). Once a user is connected to the conference, a conference call bridge 560 may be used to bridge the call to the event moderator bridge 570, which offers service delivery, product support, operators, etc. An audio streaming event 550 may be established via an Internet connection to a user's computer, smartphone or other communication data device to provide streaming access to the event via a remote participant 572. Also, a management operator 572 may be available through the established session to provide support (Q&A).

The event moderator bridge 570 may provide conference moderation, Q&A processing, event head count, notification delivery, notification call processing, trunk group port monitoring and stream participant management. According to another example, a phone may ring and a case answering machine may play a message to which a user may respond "NO THANKS" answer with no DTMF response, or press "1" as a response. In another case, "YES" may be selected to join a conference, which may be sent to an enter mode operator 552, or a pre-registered user may "1" to join live event now. The predetermined call window may begin calling 30 minutes prior to a conference/event and continue calling until 5 minutes after start of conference (or later). The gateway 538 may function by transferring a call with no bridge function enabled to maintain a caller leg or add a leg to a call bridge but drop the outdial power/resource to permit a next call function.

Figure 6:
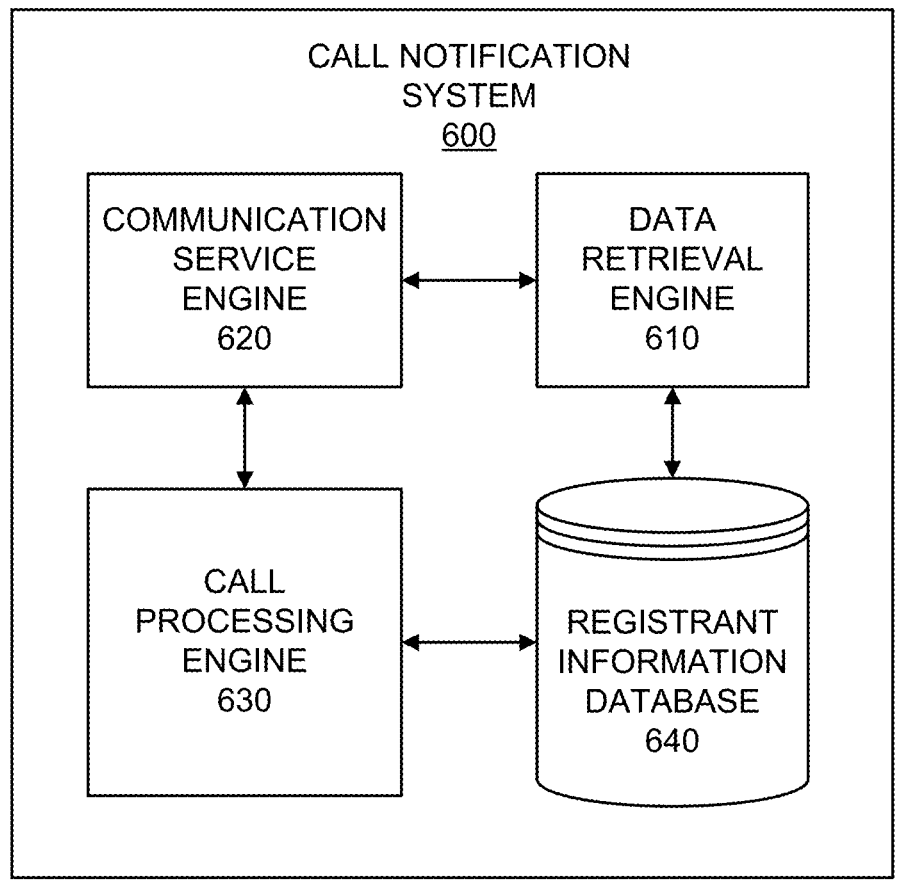
FIG. 6 illustrates an example system diagram of a caller notification system according to example embodiments of the present invention.

FIG. 6 illustrates an example call notification processing system according to example embodiments of the present invention. Referring to FIG. 6, the call notification system 600 may include a registrant information database 640 of user's intended to participate in a live event. The system 600 may also include a data retrieval engine 610, a communication service engine 620 and a call processing engine 630 each of which contributes to the processing of user device access to live events.

According to one example method of operation, customized event data may be provided to an end user communication device, such as a mobile phone, smartphone, tablet computing device, computer, landline telephone, etc. The system 600 may begin by retrieving event user preference information from the registrant information database 640. The user preference(s) may include voice communication, text message communication, email communication, etc., to receive event notifications and access options on his or her device. The system 600 may transmit an initial event notification message to the end user communication device based on the event user preference information to notify the end user of an upcoming event. The event notification message may first be transmitted by a voice call according to a predetermined user preference stored in the database 640. The data retrieval engine 610 may retrieve the user preference information and provide the information to a communication service engine 620, which retrieves a phone number associated with the user device and prepares the call processing engine 630 to transmit a call, text message, email, etc., depending on the user preference. The system 600 may receive a response message from the user device indicating a current availability of the end user responsive to the notification sent to end user device.

Examples of event user preference information may include communication contact preferences, such as a mobile device preference, a voice call preference, a text message preference and an email communication preference. The end user device may transfer back an indication that the end user is currently unavailable assuming the end user is on the other phone or is away from his or her phone and cannot confirm that the notification was received. In response, another event notification may be transmitted to the end user device by another communication message format different from an initial communication message format of the initial event notification message. The first and second message formats may be retrieved from a user record stored in the database 640 indicating a priority of communication preferences, for example, first preference voice call, second preference text message, third preference email, etc. If the user device is unresponsive, another event notification may be transmitted indicating that the event is currently in progress and provide an option to access the event when the user is available. Alternatively, the event notification may indicate that the event is finished and may provide an option to access a replay of the event. The system 600 may also be configured to perform an automatic number identification (ANI) comparison to determine whether there is a match between an ANI associated with the end user device and an ANI stored in the database 640, and by determining the match exists, the user device may be connected to the event session and streaming audio and/or video may be provided to the end user device.

Example embodiments are preferably realized in a hardware device, such as, a computer, cellular phone, or other mobile terminal device etc. In other embodiments, the present invention may be realized in hardware, software, firmware or a combination of hardware, software and/or firmware. The above example embodiments may also be implemented in software code and may be stored on a computer readable medium, such as, for example, nonvolatile memory devices (e.g., RAM, ROM, hard disk etc.). The software code may be accessed from the computer readable medium and may be executed by a processor. The executed program may provide one or more of the features of the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of the other figures.

Figure 7:
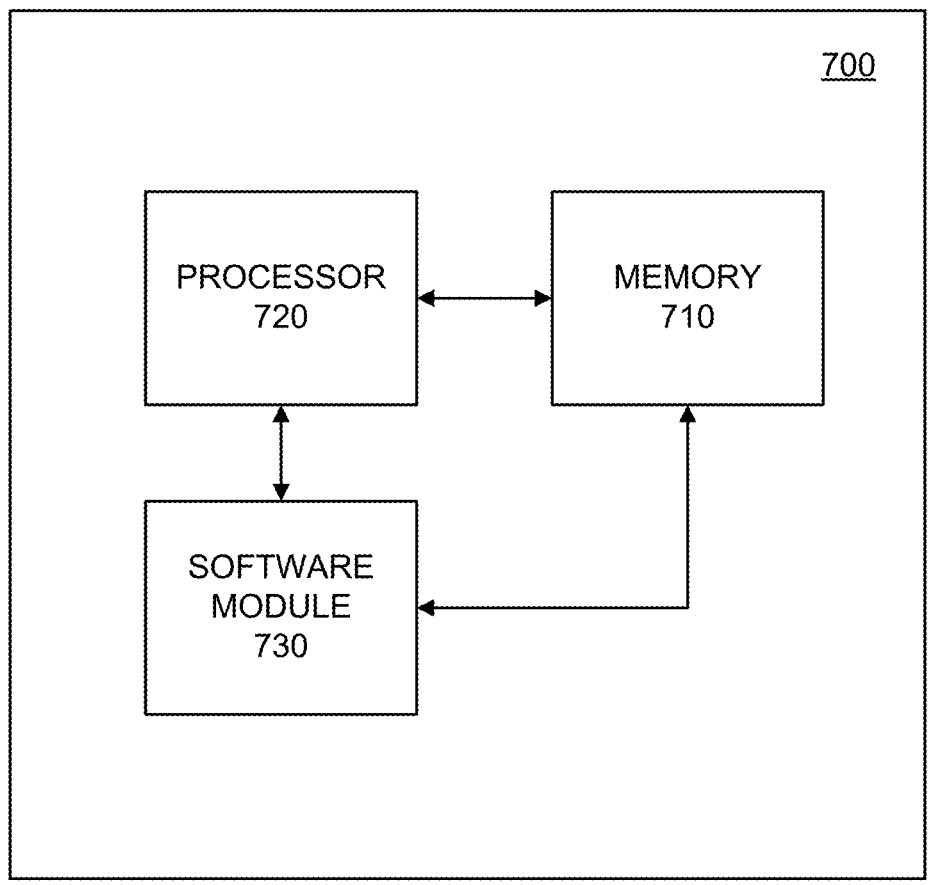
FIG. 7 illustrates an example network entity configured to store instructions and processing hardware for performing operations according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Figure 8:
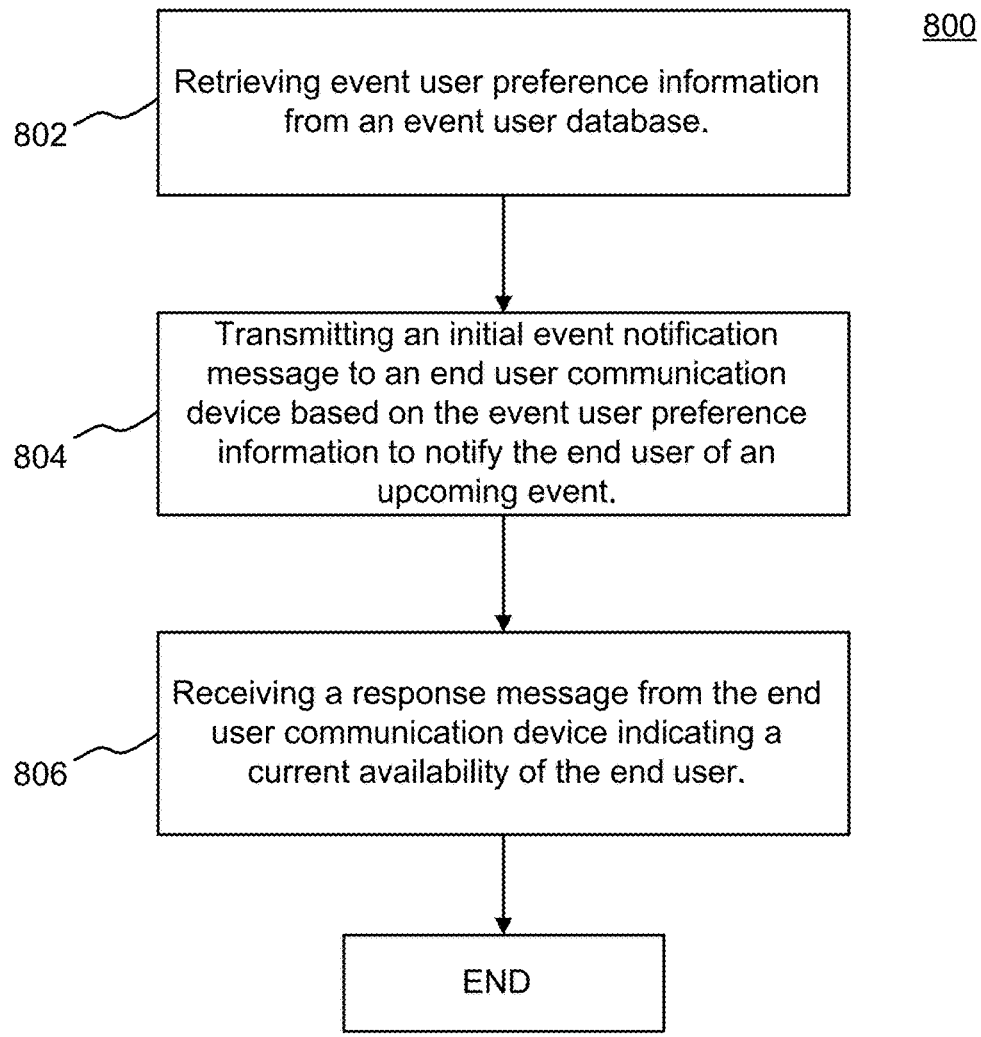
FIG. 8 illustrates an example method of operation according to example embodiments of the present invention.

FIG. 8 illustrates one example method of operation according to example embodiments of the present invention. Referring to FIG. 8, a method 800 of providing customized event data to an end user communication device is disclosed. The method may include retrieving event user preference information from an event user database at operation 802 and transmitting an initial event notification message to an end user communication device based on the event user preference information to notify the end user of an upcoming event at operation 804. The method also includes receiving a response message from the end user communication device indicating a current availability of the end user at operation 806.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   transmitting an initial event notification message to an end user communication device based on a primary communication preference of:
      at least one primary communication contact preference and at least one secondary communication preference; and
      at least two of a mobile device preference, a computer device preference, a voice call preference, a text message preference and an email preference;
   transmitting another event notification to the end user communication device via a different communication medium, based on the at least one secondary communication preference; and
   joining, from the end user communication device, an event via the different communication medium while the initial communication medium is currently being occupied via a current event in progress on the end user communication device.

2. The method of claim 1, comprising retrieving the primary communication preference from an event user database.

3. The method of claim 1, comprising transmitting the another event notification to the end user communication device by another communication message format.

4. The method of claim 3, wherein the another communication message format is different from an initial communication message format of the initial event notification message.

5. The method of claim 1, wherein the another event notification comprises an indicator that the event is currently in progress and a user option to access the event.

6. The method of claim 1, wherein the another event notification comprises an indicator that the event is finished and a user option to access a replay of the event.

7. The method of claim 1, further comprising:
   performing an automatic number identification (ANI) comparison to determine whether there is a match between an ANI associated with the end user communication device and an ANI stored in a user preference database; and
   upon determining the match exists, connecting the user device to an active event session associated with the event and providing streaming audio and video to the end user device.

8. An apparatus, comprising:
   a transmitter configured to transmit an initial event notification message to an end user communication device based on a primary communication preference of:
      at least one primary communication contact preference and at least one secondary communication preference; and
      at least two of a mobile device preference, a computer device preference, a voice call preference, a text message preference and an email preference;
   wherein the transmitter is further configured to transmit another event notification to the end user communication device via a different communication medium, based on the at least one secondary communication preference; and wherein a receiver is configured to join, from the end user communication device, an event via the different communication medium while the initial communication medium is currently being occupied via a current event a current event in progress on the end user communication device.

9. The apparatus of claim 8 comprising a processor configured to retrieve the primary communication preference from an event user database.

10. The apparatus of claim 8, wherein the transmitter is further configured to transmit the another event notification to the end user communication device by another communication message format.

11. The apparatus of claim 10, wherein the another communication message format is different from an initial communication message format of the initial event notification message.

12. The apparatus of claim 8, wherein the another event notification comprises an indicator that the event is currently in progress and a user option to access the event.

13. The apparatus of claim 8, wherein the another event notification comprises an indicator that the event is finished and a user option to access a replay of the event.

14. The apparatus of claim 8, comprising a processor is configured to perform an automatic number identification (ANI) comparison to determine whether there is a match between an ANI associated with the end user communication device and an ANI stored in a user preference database, and upon a determination that the match exists, the processor is configured to connect the user device to an active event session associated with the event and provide a stream of audio and video to the end user device.

15. A non-transitory computer readable storage medium configured to store instructions that when executed cause a processor to perform:
   transmitting an initial event notification message to an end user communication device based on a primary communication preference of:
      at least one primary communication contact preference and at least one secondary communication preference; and
      at least two of a mobile device preference, a computer device preference, a voice call preference, a text message preference and an email preference;
   transmitting another event notification to the end user communication device via a different communication medium, based on the at least one secondary communication preference; and
   joining, from the end user communication device, an event via the different communication medium while the initial communication medium is currently being occupied via a current event in progress on the end user communication device.

16. The non-transitory computer readable storage medium of claim 15 configured to store instructions that when executed cause the processor to perform retrieving the primary communication preference from an event user database.

17. The non-transitory computer readable storage medium of claim 15 configured to store instructions that when executed cause a processor to perform transmitting the another event notification to the end user communication device by another communication message format.

18. The non-transitory computer readable storage medium of claim 17, wherein the another communication message format different from an initial communication message format of the initial event notification message.

19. The non-transitory computer readable storage medium of claim 15, wherein the another event notification comprises at least one of an indicator that the event is currently in progress and a user option to access the event, and an indicator that the event is finished and a user option to access a replay of the event.

20. The non-transitory computer readable storage medium of claim 15, wherein the processor is further configured to perform:
   performing an automatic number identification (ANI) comparison to determine whether there is a match between an ANI associated with the end user communication device and an ANI stored in a user preference database; and
   upon determining the match exists, connecting the user device to an active event session associated with the event and providing streaming audio and video to the end user device.

* * * * *